United States Patent
Abe (10) Patent No.: US 7,017,889 B2
(45) Date of Patent: Mar. 28, 2006

(54) ACTUATOR DRIVE CONTROL DEVICE FOR ACTIVE VIBRATION ISOLATION SUPPORT SYSTEM, AND METHODS OF USING SAME

(75) Inventor: Atsushi Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/862,825

(22) Filed: Jun. 7, 2004

(65) Prior Publication Data

US 2005/0006831 A1    Jan. 13, 2005

(30) Foreign Application Priority Data

Jun. 13, 2003    (JP)    ............................. 2003-168674

(51) Int. Cl.
*F16F 13/00* (2006.01)

(52) U.S. Cl. ................................................ 267/140.15

(58) Field of Classification Search ........... 267/140.11, 267/140.12, 140.13, 140.14, 140.15; 123/192.1, 123/192.2
See application file for complete search history.

(56) References Cited

U.S. PATENT DOCUMENTS 5,939,625 A * 8/1999 Torii et al. ............. 267/140.11
6,158,415 A * 12/2000 Ichikawa et al. ...... 123/339.23
6,459,970 B1 * 10/2002 Goto et al. ............ 267/140.11

FOREIGN PATENT DOCUMENTS

JP    07-042783    2/1995

* cited by examiner

*Primary Examiner*—Melanie Torres
(74) *Attorney, Agent, or Firm*—Carrier, Blackman & Associates, P.C.; Joseph P. Carrier; William D. Blackman (57) ABSTRACT

In an actuator drive control device for an active vibration isolation support system, amplitudes of engine vibration are estimated when a front bank and a rear bank operate. When a difference between the amplitudes is large, an operation of an actuator is controlled at the time when the front bank operates, based on the amplitude of the engine vibration at the previous time when the front bank operates, and the operation of the actuator is controlled at the time when the rear bank operates, based on the amplitude of the engine vibration at the previous time when the rear bank operates. As a result, even when the vibration state of the engine at the time of operation of each bank differs, it is possible to control the operation of the actuator based on the actual vibration state of the engine when the actuator operates, whereby engine vibration can be effectively isolated by the active vibration isolation support system.

12 Claims, 9 Drawing Sheets

ACTUATOR DRIVE CONTROL DEVICE FOR ACTIVE VIBRATION ISOLATION SUPPORT SYSTEM, AND METHODS OF USING SAME

BACKGROUND OF THE INVENTION

1. Field of the Invention

The present invention relates to an actuator drive control device for an active vibration isolation support system for controlling an operation of an actuator to suppress transmission of vibration from an engine having a plurality of banks.

2. Description of the Related Art

Such an active vibration support isolation system is known from Japanese Patent Application Laid-open No. 7-42783.

This active vibration isolation support system changes a spring constant by applying electrical current to an actuator so as to vibrate a movable member. The relationship between the phase and peak electrical current value of the applied electrical current that sets the spring constant is stored as a map in advance, and the phase and the peak electrical current value of the electrical current to be applied to the actuator are obtained from the map according to the rotational speed of the engine, thereby allowing the active vibration isolation support system to exhibit an effective vibration isolation function in various regions of the rotational speed of the engine.

The conventional active vibration isolation support system estimates the vibration state of the engine in each operation period of each cylinder, and based on this vibration state, the active vibration isolation support system controls the operation of the actuator in the operation period of the next cylinder. Therefore, in a V-type engine having a front bank and a rear bank, based on the vibration state estimated in the operation period of the cylinder in the front bank, the active vibration isolation support system controls the operation of the actuator in the subsequent operation period of the cylinder in the rear bank, or based on the vibration stage estimated in the operation period of the cylinder in the rear bank, the active vibration isolation support system controls the operation of the actuator in the subsequent operation period of the cylinder in the front bank.

In this case, if the vibration state due to the operation of the cylinder in the front bank and the vibration state due to the operation of the cylinder in the rear bank are the same, there is no problem, but when the vibration states differ significantly, there occurs a deviation between the actual vibration state of the engine and the control of the actuator to isolate the vibration, leading to a possibility that the active vibration isolation support system cannot exhibit an effective vibration isolation function.

Figure 9A:
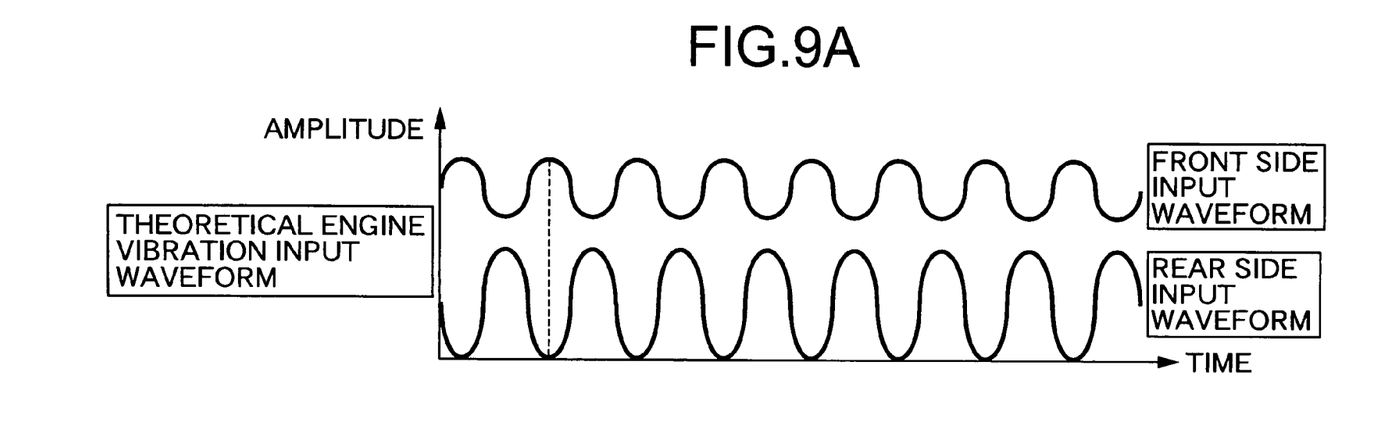
FIGS. 9A and 9B are diagrams showing a difference in vibration state between a front bank and a rear bank.
Figure 9B:
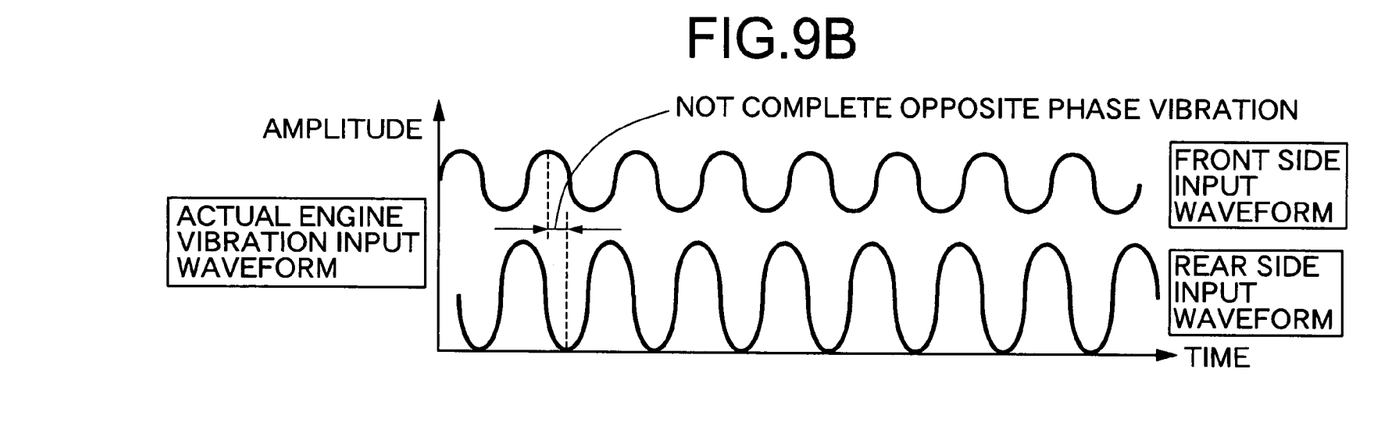

For example, as shown in FIG. 9A, the vibration waveform by the operation of the front bank should theoretically be completely in opposite phase from the vibration waveform by the operation of the rear bank, but as shown in FIG. 9B, the vibration waveforms are not completely in opposite phase from each other, and a phase shift occurs, because the banks of the engine do not actually have completely symmetrical structures. Accordingly, when control of the actuator in the operation period of one bank is performed based on the vibration state of the other bank of the front bank and rear bank, there arises a possibility that the active vibration isolation support system performs an inappropriate operation.

SUMMARY OF THE INVENTION

The present invention has been achieved under the above-mentioned circumstances, and it is an object of the present invention to provide an active vibration isolation support system for an engine including a plurality of banks, in which the system exhibits an effective vibration isolation function.

In order to achieve the above-described object, according to a first feature of the present invention, there is provided an actuator drive control device for an active vibration isolation support system for controlling an operation of an actuator by control means so as to suppress transmission of vibration of an engine having a plurality of banks, wherein the control means estimates a vibration state of the engine when each of the banks operates, and controls the operation of the actuator at the time when a predetermined bank operates, based on the estimated vibration state of the engine at the previous time when the predetermined bank operates.

With the first feature, the operation of the actuator at the time when the predetermined bank operates is controlled based on the estimated vibration state of the engine at the previous time when the predetermined bank operates, among a plurality of banks. Therefore, even when the vibration state of the engine at the time of operation of each of the banks differs, it is possible to control the operation of the actuator based on the actual vibration state of the engine at the previous time when the actuator operates, thus allowing the active vibration isolation support system to effectively exhibit the vibration isolation function.

In addition to the first feature, according to a second feature of the present invention, the control means calculates a difference In the vibration state between the respective banks, and when the difference is less than or equal to a threshold value, i.e., a first threshold value, the control means controls the operation of the actuator of this time based on the vibration state of the bank which operated most recently.

With the second feature, when the difference in the vibration state between the respective banks is the first threshold value or smaller, that is, when the difference in the vibration state of each bank is small, the operation of the actuator of this time is controlled based on the vibration state of the bank which operates most recently. Therefore, the active vibration isolation support system can be controlled with good responsiveness even in the transition period of the operation state of the engine.

In addition to the first feature, according to a third feature of the present invention, the control means calculates a difference in the vibration state between the respective banks, and when the difference is greater than or equal to another threshold value. i.e., a second threshold value, the control means controls the operation of the actuator of this time based on the vibration state at the time when the same cylinder as a cylinder which operates this time operated last time.

With the third feature, when the difference in the vibration state of the respective banks is the second threshold or larger, that is, when it is substantially impossible to determine whether the difference in the vibration state is large or small due to burning or the like of the cylinder, the operation of the actuator of this time is controlled based on the vibration state at the time when the same cylinder as the cylinder, which operates this time, operates last time. Therefore, the operation of the active vibration isolation support system can be continued without hindrance while securing the vibration isolation function.

The front bank Bf and the rear bank Br correspond to the banks of the present invention, and the electronic control unit U in the embodiment corresponds to the control means of the present invention.

DESCRIPTION OF THE PREFERRED EMBODIMENT

One embodiment of the present invention will be described with reference to the accompanying drawings.

An active vibration isolation support system (ACM) M shown in FIG. 1 to FIG. 4 elastically supports an engine E (V-type four-cycle six-cylinder engine in this embodiment) of an automobile in a vehicle body frame F. The system is controlled by an electronic control unit U to which a crank pulse sensor Sa for detecting crank pulses that are outputted accompanying rotation of a crankshaft of the engine E is connected. Twenty-four crank pulses are outputted per rotation of the crankshaft, that is, one crank pulse is outputted for every 15 degrees of crank angle.

Figure 1:
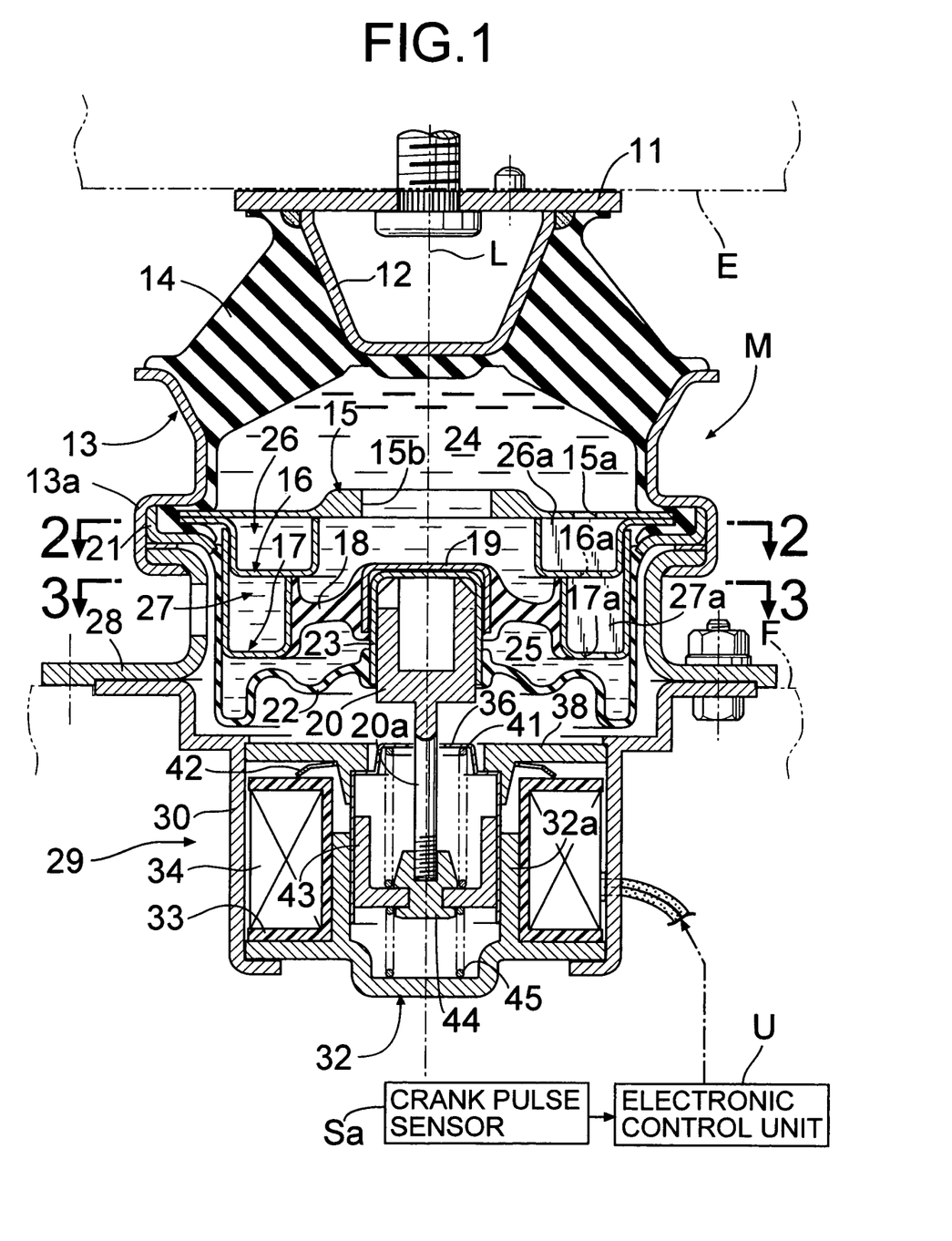
FIG. 1 is a vertical sectional view of an active vibration isolation support system according to an embodiment of the present invention.
Figure 2:
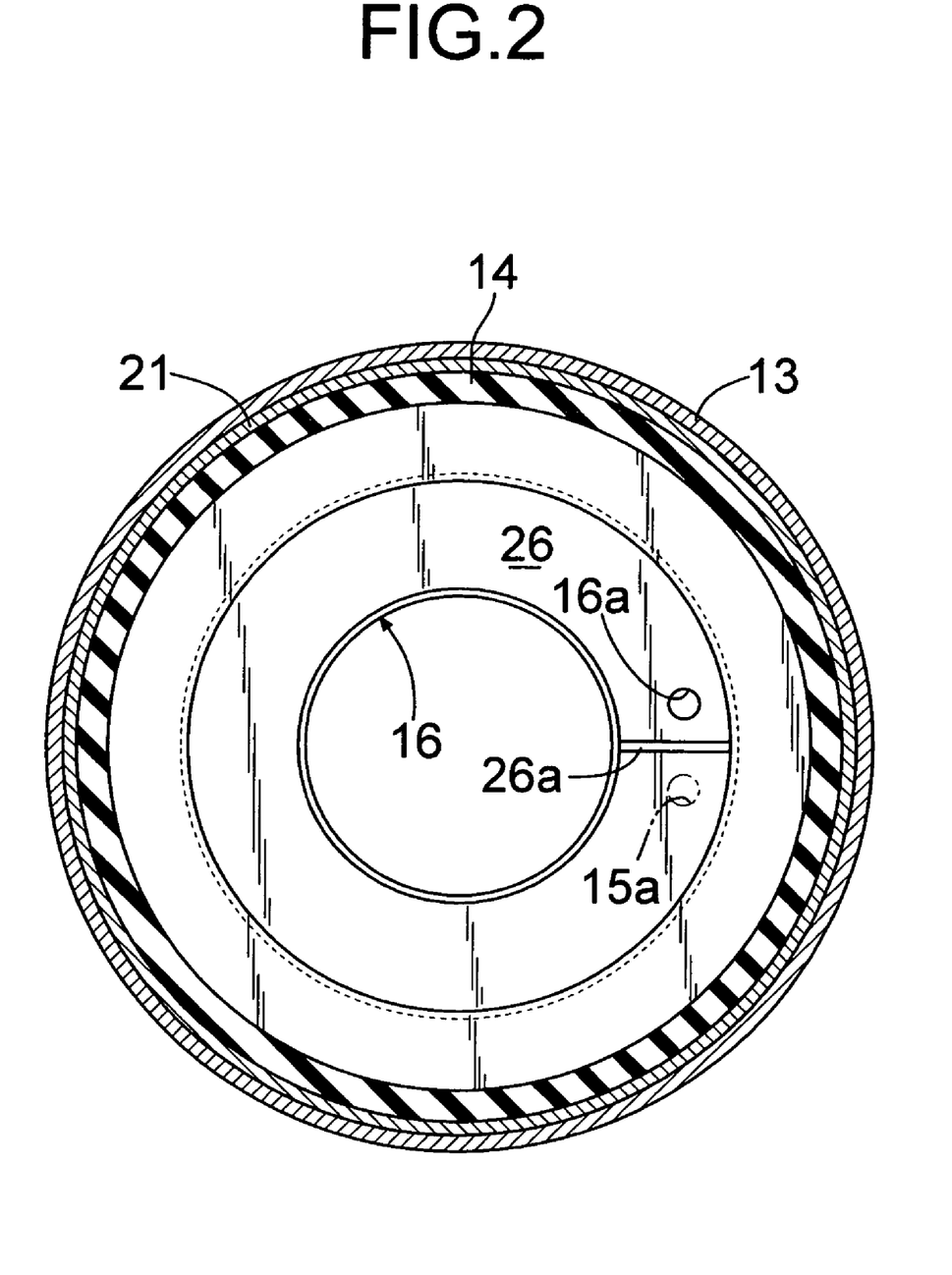
FIG. 2 is a sectional view taken along the line 2—2 in FIG. 1.
Figure 3:
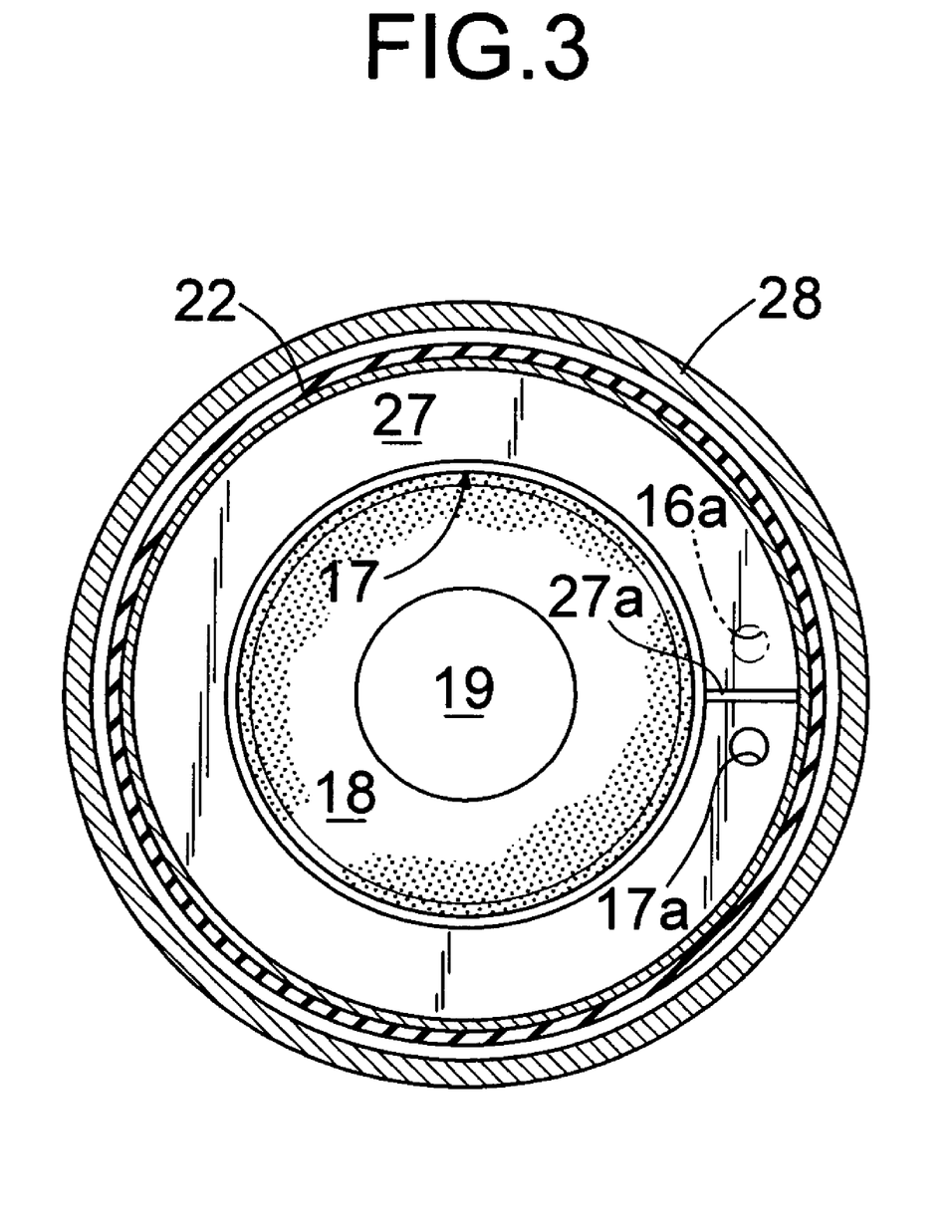
FIG. 3 is a sectional view taken along the line 3—3 in FIG. 1.

The active vibration isolation support system M has a structure that is substantially symmetrical with respect to an axis L. The system M includes an inner tube 12 that is welded to a plate-shaped mounting bracket 11 that is joined to the engine E, and an outer tube 13 that is placed coaxially on an outer periphery of the inner tube 12. The inner tube 12 and the outer tube 13 are bonded by vulcanization bonding to an upper end and a lower end, respectively, of a first elastic body 14 made of thick rubber, respectively. A disc-shaped first orifice-forming member 15 having an aperture 15b in its center, an annular second orifice-forming member 16 having a dipper-shaped section open at the top, and an annular third orifice-forming member 17 similarly having a dipper-shaped section open at the top are welded into a single unit. The outer peripheries of the first orifice-forming member 15 and the second orifice-forming member 16 are abuttingly superimposed and fixed to a crimping fixing part 13a provided in a lower part of the outer tube 13.

The outer periphery of a second elastic body 18 made of a rubber membrane is fixed by vulcanization bonding to the inner periphery of the third orifice-forming member 17. An outer cap member 19 fixed by vulcanization bonding to the inner periphery of the second elastic body 18 is fixed by press fitting onto a movable member 20, disposed on the axis L to be vertically movable. The outer periphery of a diaphragm 22 is fixed by vulcanization bonding to a ring member 21 that is fixed to the crimping fixing part 13a of the outer tube 13. An inner cap member 23, fixed by vulcanization bonding to the inner periphery of the diaphragm 22, is fixed onto the movable member 20 by press fitting, and is closely covered by the outer cap member 19.

A first liquid chamber 24, which is charged with a liquid, is thus defined between the first elastic body 14 and the second elastic body 18, and a second liquid chamber 25, which is charged with a liquid, is thus defined between the second elastic body 18 and the diaphragm 22. The first liquid chamber 24 and the second liquid chamber 25 communicate with each other via an upper orifice 26 and a lower orifice 27 which are formed by the first to third orifice-forming members 15, 16 and 17.

The upper orifice 26 is an annular passage formed between the first orifice-forming member 15 and the second orifice-forming member 16. A communicating hole 15a is formed in the first orifice-forming member 15 on one side of a partition wall 26a provided in a part of the upper orifice 26, and a communicating hole 16a is formed in the second orifice-forming member 16 on the other side of the partition wall 26a. Therefore, the upper orifice 26 is formed over substantially one round from the communicating hole 15a of the first orifice-forming member 15 to the communicating hole 16a of the second orifice-forming member 16 (see FIG. 2).

A lower orifice 27 is an annular passage formed between the second orifice-forming member 16 and the third orifice-forming member 17. The communicating hole 16a is formed in the second orifice-forming member 16 on one side of a partition wall 27a provided in a part of the lower orifice 27, and a communicating hole 17a is formed in the third orifice-forming member 17 on the other side of the partition wall 27a. Therefore, the lower orifice 27 is formed over substantially one round from the communicating hole 16a of the second orifice-forming member 16 to the communicating hole 17a of the third orifice-forming member 17 (see FIG. 3).

As a result of the above description, the first liquid chamber 24 and the second liquid chamber 25 communicate with each other via the upper orifice 26 and the lower orifice 27, which are connected to each other in series.

An annular mounting bracket 28 for fixing the active vibration isolation support system M to the vehicle body frame F, is fixed to the crimping fixing part 13a of the outer tube 13, and an actuator housing 30, constructing an outer shell of an actuator 29 for driving the movable member 20, is welded to a lower surface of the mounting bracket 28.

Figure 4:
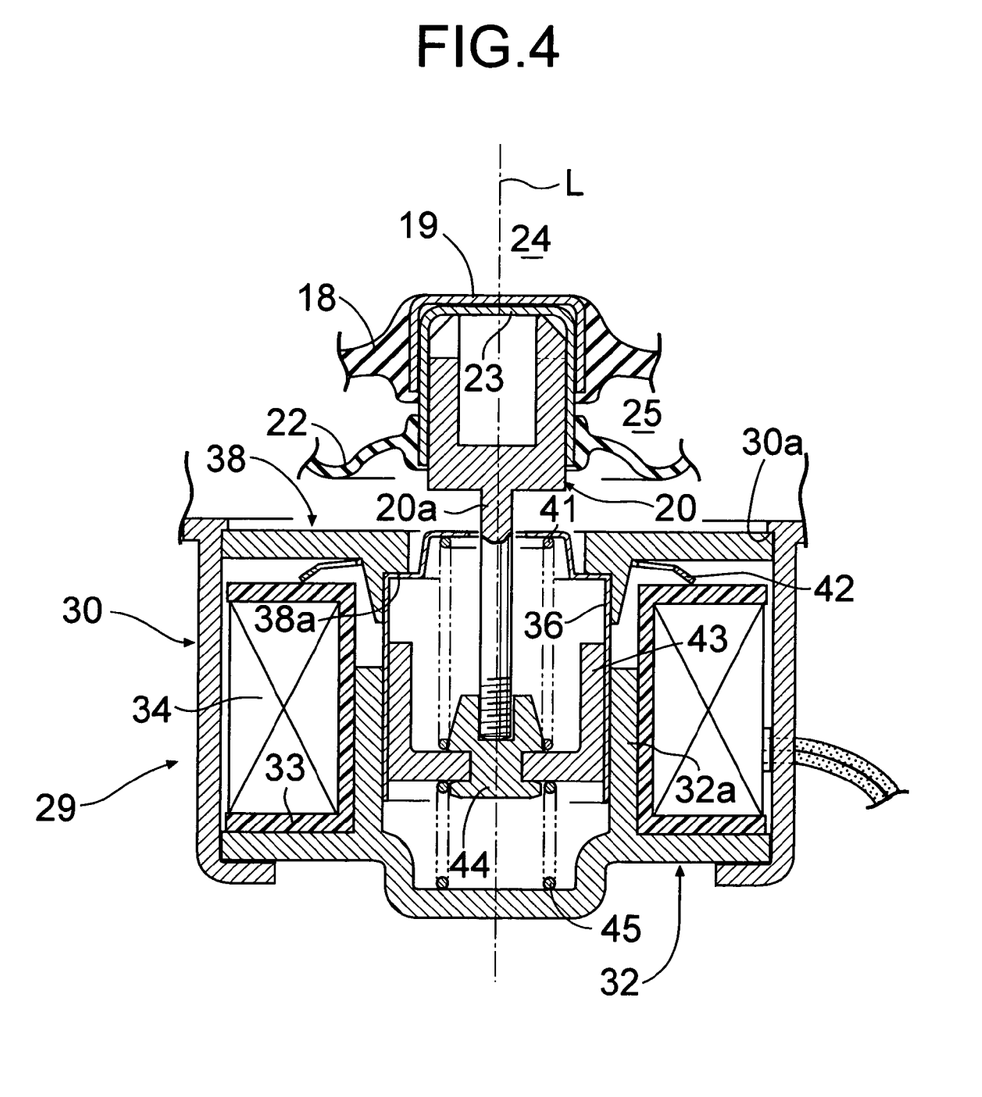
FIG. 4 is an enlarged view of an essential part of FIG. 1.

A yoke 32 is fixed to the actuator housing 30, and a coil 34, wound around a bobbin 33, is housed in a space surrounded by the actuator housing 30 and the yoke 32. A bottomed cylindrical bearing 36 is fitted in a tubular part 32a of the yoke 32, fitted in an inner periphery of the annular coil 34. A disc-shaped armature 38, facing an upper surface of the coil 34, is slidably supported on an inner peripheral surface of the actuator housing 30. A step part 38a, formed on an inner periphery of the armature 38, engages with an upper part of the bearing 36. The armature 38 is biased upward by a disc spring 42 that is disposed between the armature 38 and an upper surface of the bobbin 33, and is positioned by engagement with a retaining part 30a provided on the actuator housing 30.

A cylindrical slider 43 is slidably fined in the inner periphery of the bearing 36, and a shaft part 20a extending downward from the movable member 20 loosely penetrates through an upper base part of the bearing 36, to be connected to a boss 44 that is fixed to an interior of the slider 43. A coil spring 41 is disposed between the upper base part of the bearing 36 and the slider 43. The bearing 36 is biased upward by this coil spring 41, and the slider 43 is biased downward by the coil spring 41.

When the coil 34 of the actuator 29 is in a demagnetized state, an elastic force of the coil spring 41 acts downward on the slider 43 slidably supported in the bearing 36, and an elastic force of a coil spring 45 disposed between the slider 43 and a base surface of the yoke 32 acts upward, so that the slider 43 stops at a position where the elastic forces of both the coil springs 41 and 45 are in balance. When the coil 34 is excited in this state so as to draw the armature 38 downward, the step part 38a pushes the bearing 36 to slide it downward, thereby compressing the coil spring 41. As a result, the elastic force of the coil spring 41 increases, thereby lowering the slider 43 while compressing the coil spring 45, the movable member 20 that is connected to the slider 43 via the boss 44 and the shaft part 20a descends, and the second elastic body 18 connected to the movable member 20 deforms downward, thus increasing the capacity of the first liquid chamber 24. Conversely, when the coil 34 is demagnetized, the movable member 20 rises, the second elastic body 18 deforms upward, and the capacity of the first liquid chamber 24 decreases.

When a low-frequency engine-shake vibration occurs while the automobile is traveling, if a load inputted from the engine E deforms the first elastic body 14, thus changing the capacity of the first liquid chamber 24, the liquid travels between the first liquid chamber 24 and the second liquid chamber 25, which are connected via the upper orifice 26 and the lower orifice 27. When the capacity of the first liquid chamber 24 increases and decreases, the capacity of the second liquid chamber 25 decreases and increases accordingly, and this change in the capacity of the second liquid chamber 25 is absorbed by the elastic deformation of the diaphragm 22. Since the shapes and dimensions of the upper orifice 26 and the lower orifice 27 and the spring constant of the first elastic body 14 are set so that a high spring constant and a high attenuation force can be obtained in a region of the frequency of engine shake vibration, the vibration that is transmitted from the engine E to the vehicle body frame F can be reduced effectively.

In this frequency region of the engine shake vibration, the actuator 29 is maintained in a non-operational state.

If vibration having a frequency higher than that of the engine shake vibration, namely, idling vibration or muffled sound vibration due to the rotation a crankshaft of the engine E occurs, the liquid within the upper orifice 26 and the lower orifice 27 which connect the first liquid chamber 24 and the second liquid chamber 25 is brought into a stick state and cannot exhibit the vibration isolation function, and therefore the actuator 29 is operated so as to exhibit the vibration isolation function.

Figure 5:
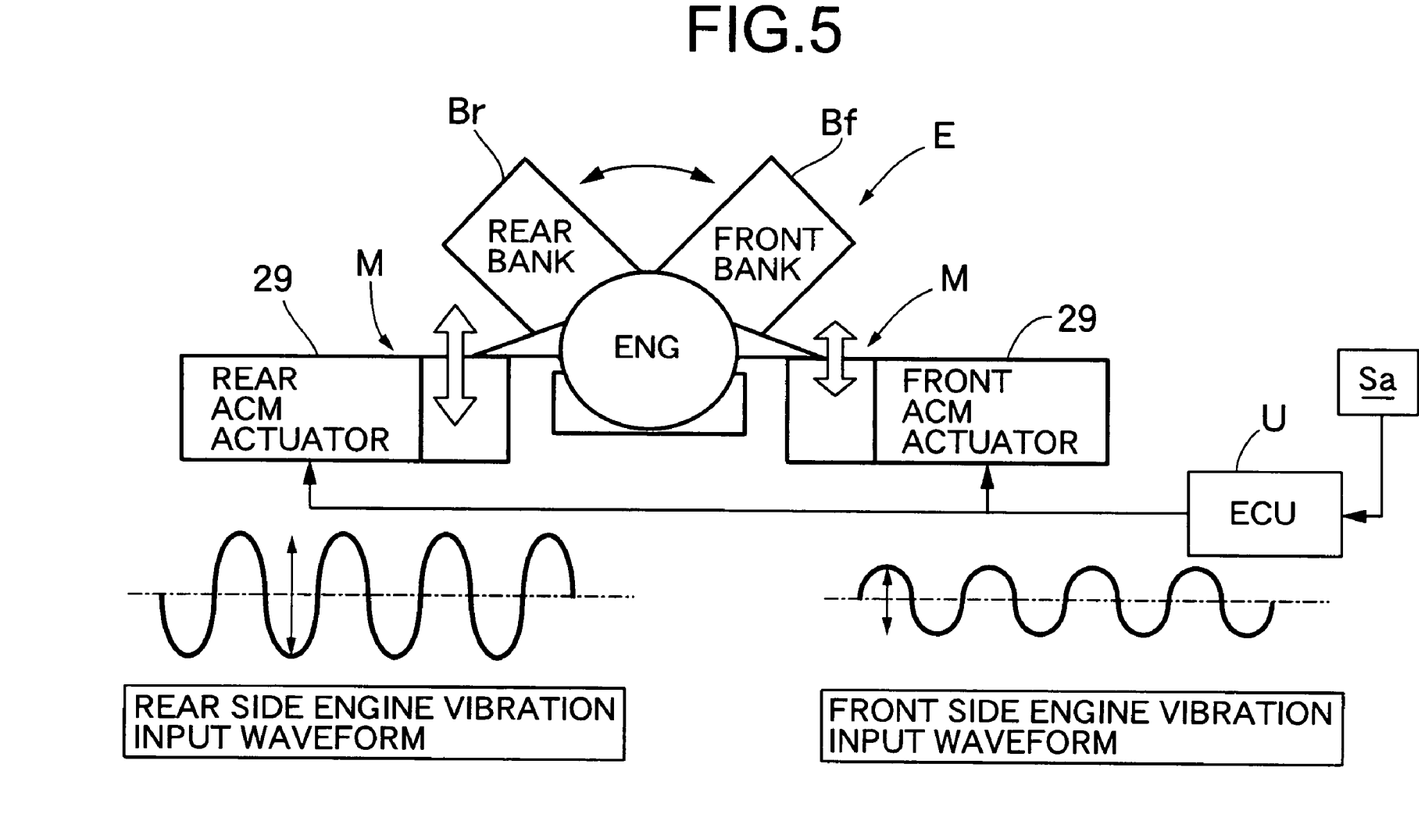
FIG. 5 is a diagram showing an arrangement of the active vibration isolation support system supporting a V-type engine.

As shown in FIG. 5, the V-type four-cycle six-cylinder engine E includes a front bank Bf and a rear bank Br, and its front side and rear side are supported respectively by the active vibration isolation support systems M and M disposed on opposite sides of the engine. In order for the vibration isolation function of the actuator 29 and 29 of the active vibration isolation support systems M anti M of front and rear sides to be cohabited, the electronic control unit U controls the application of electrical current to the actuators 29 and 29 based on the signal from the crank pulse sensor Sa. Although the engine crankshaft is not shown in FIG. 5, it will be understood that the crankshaft is disposed within the engine between the banks Bf and Br, such that the banks Bf and Br and their associated actuators 29 and 29 are disposed on opposite sides of the crankshaft.

Figure 6:
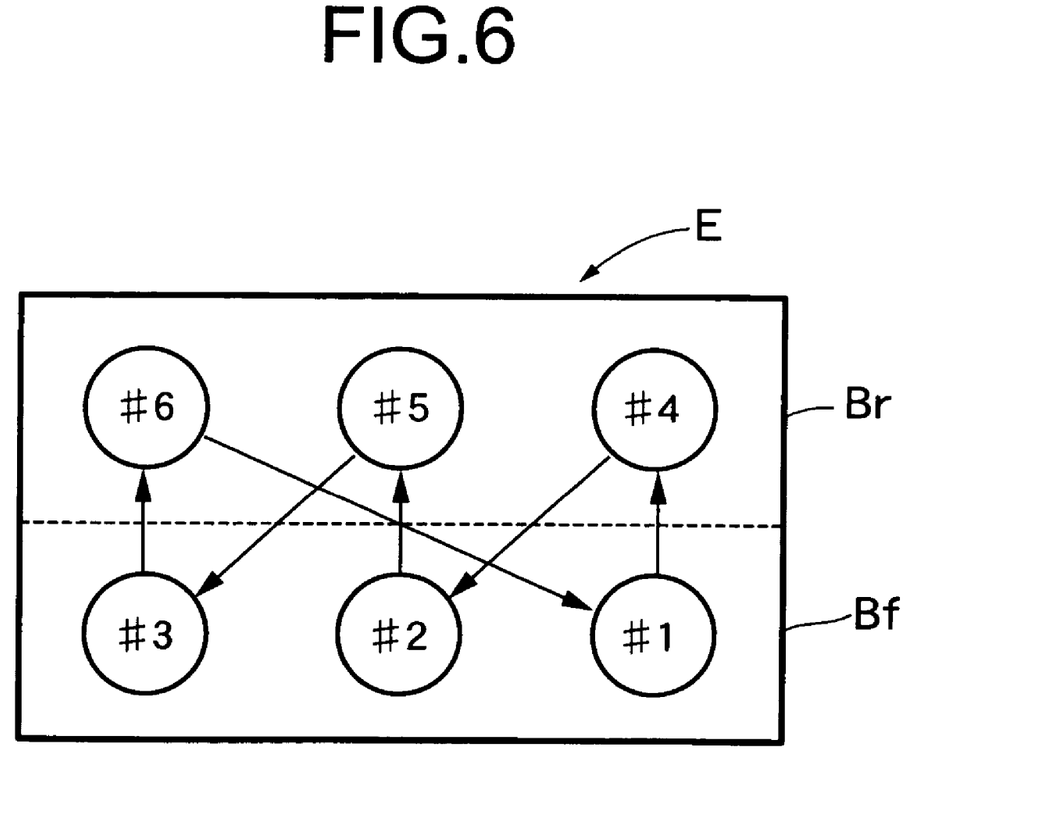
FIG. 6 is a diagram showing ignition sequence of cylinders of a front bank and a rear bank.

As shown in FIG. 6, the engine E includes three cylinders #1, #2 and #3 in the front bank Bf, and includes three cylinders #4, #5 and #6 in the rear bank Br. The ignition firing sequence of the six cylinders #1 to #6 is #1→#4→#2→#5→#3→#6, so that the cylinders in both the banks Bf and Br explode alternately.

Next, the details of the control of the active vibration isolation support system M will be described with reference to the flow chart in FIG. 8.

Firstly, in step S1, the vibration state of the engine E is estimated on the operation periods of the cylinders, that is, on the operation periods in which any cylinder of the #1, #2 and #3 of the front bank Bf, and any cylinder of the #4, #5 and #6 of the rear bank Br explodes. In the four-cycle six-cylinder engine E in the embodiment, six explosions take place while the crankshaft makes two rotations, its operation period is a cycle of 120 degrees in the crank angle, and six operation periods P1 to P6 are included in two rotations of the crankshaft. Among them, the operation periods of the front bank Bf are P1, P3 and P5, and the operation periods of the rear bank Br are P2, P4 and P6 (see FIG. 7).

Namely, in the operation periods having the crank angle of 120 degrees, eight crank pulses outputted at every 15 degrees of the crank angle are read, and the time interval between the crank pulses is calculated. Subsequently, a crank angular speed $\omega$ is calculated by dividing the crank angle of 15 degrees by the time interval between the crank pulses, then, the crank angular speed $\omega$ is differentiated with respect to time, to calculate a crank angular acceleration $d\omega/dt$, and a torque Tq around the crankshaft of the engine E is obtained from $$Tq = I \times d\omega/dt$$

where I denotes the moment of inertia around the crankshaft of the engine E. If it is assumed that the crankshaft rotates at a constant angular speed $\omega$, this torque Tq is 0, however, acceleration of the piston increases the angular speed $\omega$ during expansion stroke, and deceleration of the piston decreases the angular speed $\omega$ during the compression stroke, thus generating the torque Tq in proportion to the crank angular acceleration $d\omega/dt$. Then, the maximum torque value and the minimum torque value that are adjacent in time are determined, and the vibration state (amplitude) of the engine E is estimated as a difference between the maximum value and the minimum value of the torque, namely, the amount of change in torque.

When the vibration state of the engine E in each of the operation periods P1 to P6 is estimated in the aforementioned step S1, control parameters of the active vibration isolation support systems M are searched based on the vibration state of the engine E in step S2, and driving timings of the active vibration isolation support systems M are determined in step S3. The driving timing of each of the active vibration isolation support systems M corresponds to the time difference between the time at which a predetermined operation period starts and the time at which the drive of the active vibration isolation support system M in the operation period starts.

In the subsequent step S4, the amplitudes by which the active vibration isolation support systems M of the front bank Bf and the rear bank Br are driven are determined, based on the vibration state of the engine E. In this case, an amplitude AFR of the front bank Bf is determined based on the vibration state of the engine E in the operation periods P1, P3 and P5 of the front bank Bf, and an amplitude ARR of the rear bank Br is determined based on the vibration state of the engine E in the operation periods P2, P4 and P6 of the rear bank Br.

In the subsequent step S5, a difference DLTAMP between the amplitudes AFR and ARR of the active vibration isolation support systems M of both banks Bf and Br, of which operation periods are successive, is calculated. For example, the amplitude difference DLTAMP between the operation period P1 of the front bank Bf and the subsequent operation period P2 of the rear bank Br is calculated as an absolute value of the value obtained by subtracting the amplitude AFR(n−1) of the front bank Bf of last time (operation period P1) from the amplitude ARR (n) of the rear bank Br of this time (operation period P2).

$$DLTAMP=|ARR(n)-AFR(n-1)|$$

The amplitude difference DLTAMP between the operation period P2 of the rear bank Br and the subsequent operation period P3 of the front bank Bf is calculated as an absolute value of the value obtained by subtracting the amplitude ARR (n−1) of the rear bank Br of last time (operation period P2) from the amplitude AFR(n) of the front bank Bf of this time (operation period P3).

$$DLTAMP=|AFR(n)-ARR(n-1)|$$

In the subsequent step S6, the amplitude difference DLTAMP is compared with a first threshold value ΔA1, and when the amplitude difference DLTAMP is the first threshold value ΔA1 or less, namely, when the amplitude difference DLTAMP of both the banks Bf and Br is small, the operation of the actuator 29 of the active vibration isolation support system M in the operation period of this time is controlled, based on the amplitude of the operation period of last time in step S7 as conventionally controlled.

More specifically, based on the amplitude AFR of the front bank Bf estimated in the operation period P1, the active vibration isolation support system M of the rear bank Br in the subsequent operation period P2 of the rear bank Br is controlled; based on the amplitude ARR of the rear bank Br estimated in the operation period P2, the active vibration isolation support system M of the front bank Bf in the subsequent operation period P3 of the front bank Bf is controlled; and based on the amplitude AFR of the front bank Bf estimated in the operation period P3, the active vibration isolation support system M of the rear bank Br in the subsequent operation period P4 of the rear bank Br is controlled, which are similarly repeated thereafter.

As described above, the control of the active vibration isolation support system M in the operation period of this time is performed based on the vibration state of the engine E in the previous operation period that is most recently the operation period of this time. Therefore, responsiveness of the control of the active vibration isolation support system M can be enhanced in the transition period in which the operation state of the engine E changes.

Instead of controlling the active vibration isolation support system M of the rear bank Br based on the amplitude AFR of the front bank Bf as in the embodiment, the active vibration isolation support system M of the front bank Bf may be controlled, or both the active vibration isolation support systems M of the front bank Bf and the rear bank Br may be controlled. Likewise, instead of controlling the active vibration isolation support system M of the front bank Bf based on the amplitude ARR of the rear bank Br as in the embodiment, the active vibration isolation support system M of the rear bank Br may be controlled, or both the active vibration isolation support systems M of the front bank Bf and the rear bank Br may be controlled.

On the other hand, when the amplitude difference DLTAMP exceeds the first threshold value ΔA1 in the aforementioned step S6, and the amplitude difference DLTAMP is less than a second threshold value ΔA2 in step S8, that is, when the amplitude difference DLTAMP is large to some extent, the operation of the actuator 29 of the active vibration isolation support system M in the operation period of this time is controlled based on the amplitude of the operation period of the second previous time in the step S9.

Figure 7:
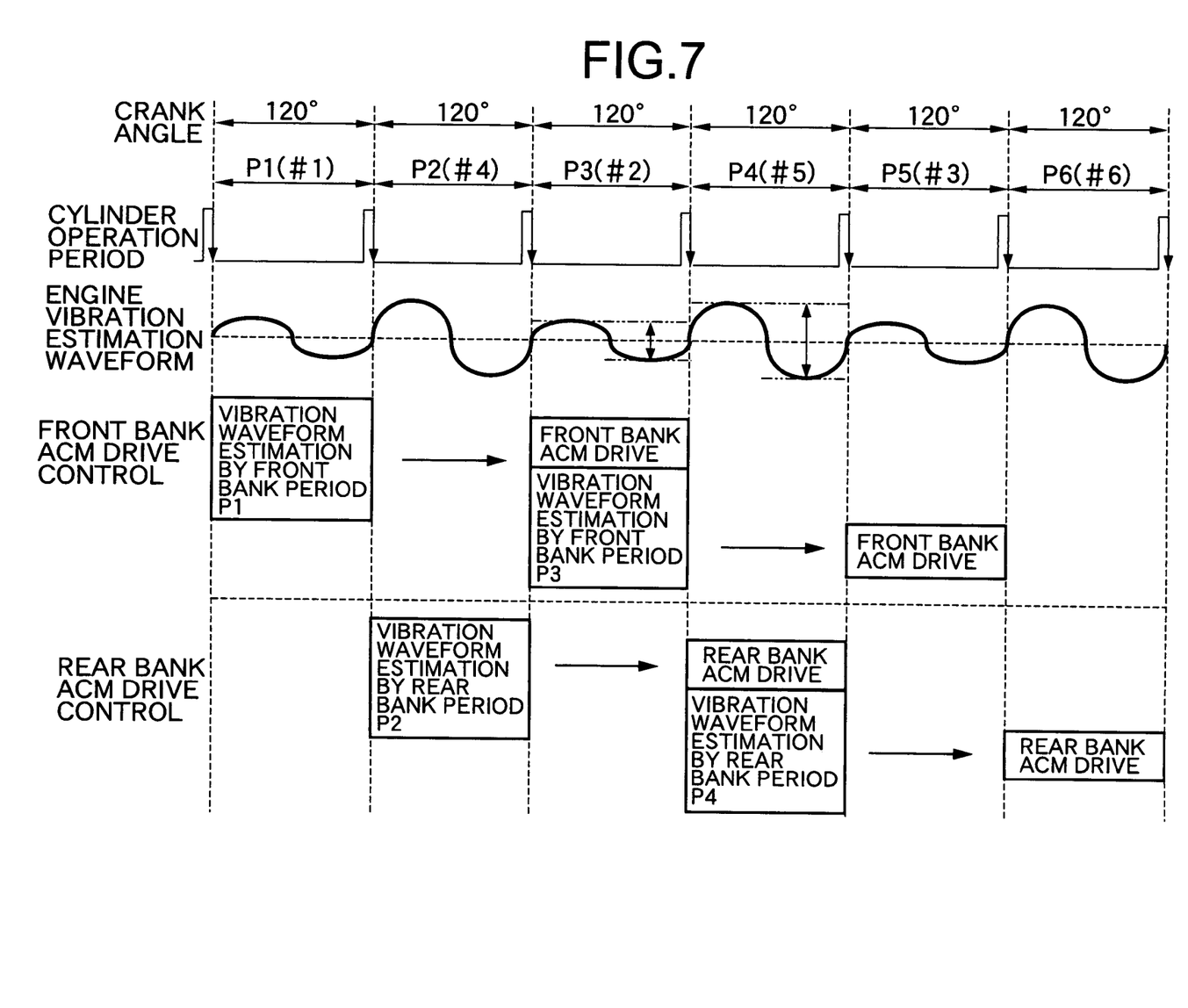
FIG. 7 is a time chart showing an operation of the embodiment.

More specifically, as shown in FIG. 7, the control of the active vibration isolation support system M of the front bank Bf in the operation period P3 is performed based on the amplitude AFR of the front bank Bf, the amplitude AFR having been estimated in the second previous operation period P1 of the front bank Bf; and the control of the active vibration isolation support system M of the front bank Bf in the operation period P5 is performed based on the amplitude AFR of the front bank Bf, the amplitude AFR having been estimated in the second previous operation period P3 of the front bank Bf. The control of the active vibration isolation support system M of the rear bank Br in the operation period P4 is performed based on the amplitude ARR of the rear bank Br, the amplitude ARR having been estimated in the second previous operation period P2 of the rear bank Br; and the control of the active vibration isolation support system M of the rear bank Br in the operation period P6 is performed based on the amplitude ARR of the rear bank Br, the amplitude ARR having been estimated in the second previous operation period P4 of the rear bank Br.

Figure 8:
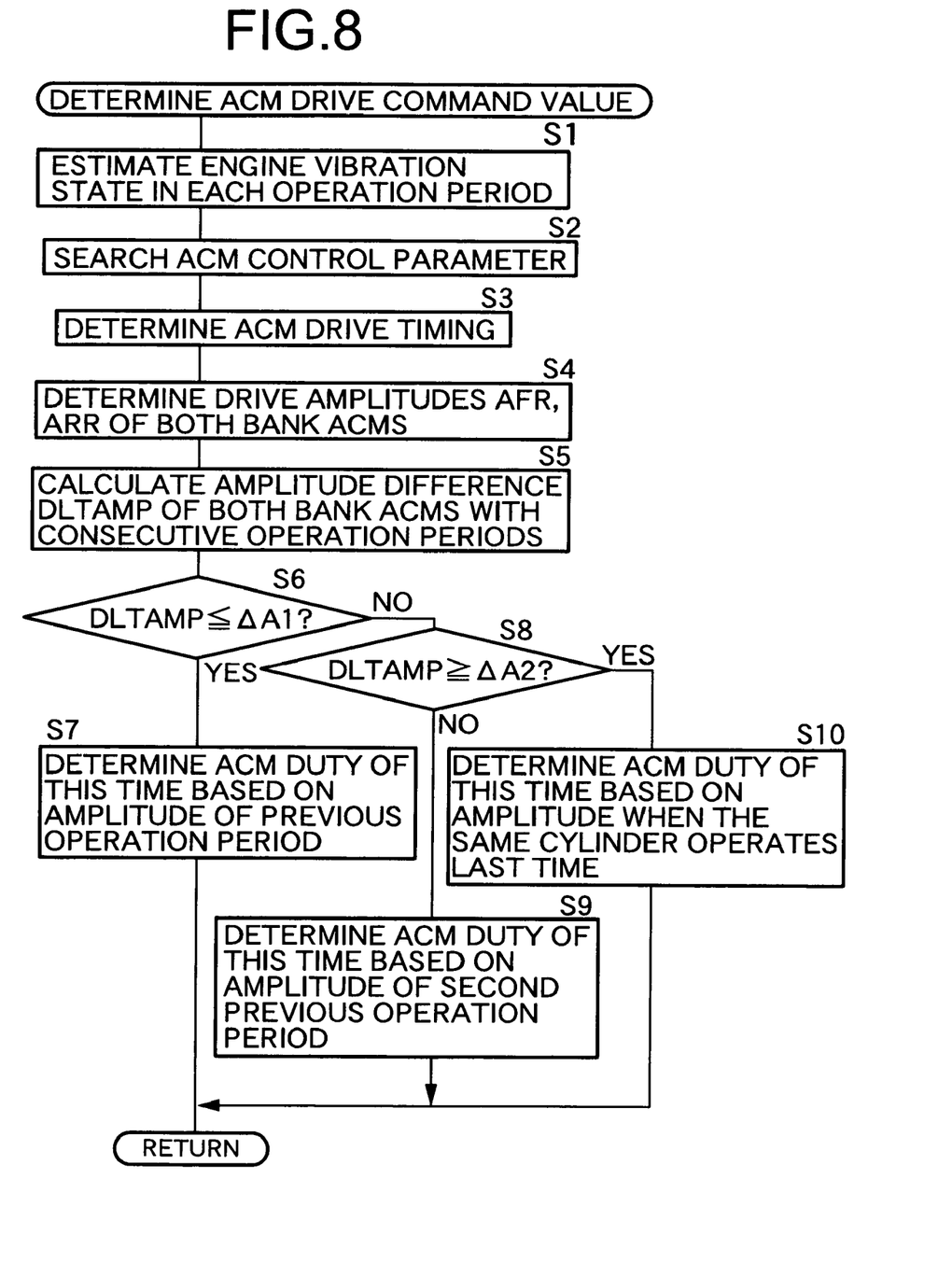
FIG. 8 is a flow chart of drive command value determining routine of the active vibration isolation support system.

As in steps S6 and S7 of the flow chart in FIG. 8, when the amplitude difference DLTAMP of the front bank Bf and the rear bank Br is small, the amplitude AFR of the front bank Bf and the amplitude ARR of the rear bank Br are substantially the same, so that there is no problem in controlling the active vibration isolation support system M in the operation period of the rear bank Br based on the amplitude AFR of the front bank Bf, and controlling the active vibration isolation support system M in the operation period of the front bank Bf based on the amplitude ARR of the rear bank Br.

However, if the above-described control is performed when the amplitude difference DLTAMP between the front bank Bf and the rear bank Br is large to some extent, there is a possibility that the control of the active vibration isolation support system M corresponding to the actual vibration state of the engine E becomes impossible, thereby deteriorating the vibration isolation function. Therefore, the control of the active vibration isolation support system M of the front bank Bf of the operation period of this time is performed based on the amplitude AFR of the front bank Bf of the second previous operation period, and the control of the active vibration isolation support system M of the rear bank Br in the operation period of this time is performed based on the amplitude ARR of the rear bank Br of the second previous operation period, thereby enabling the control the active vibration isolation support system M corresponding to the actual vibration state that is, the amplitude and phase of the actual vibration of the engine E when the active vibration isolation support system M is operated, to secure the vibration isolation function.

Instead of controlling the active vibration isolation support system M of the front bank Bf based on the amplitude AFR of the front bank Bf as in the embodiment, the active vibration isolation support system M of the rear bank Br may be controlled, or both the active vibration isolation support systems M of the front bank Bf and the rear bank Br may be controlled. Similarly, instead of controlling the active vibration isolation support system M of the rear bank Br based on the amplitude ARR of the rear bank Br as in the embodiment, the active vibration isolation support system M of the front bank Bf may be controlled, or both the active vibration isolation support systems M of the front bank Bf and the rear bank Br may be controlled.

When the amplitude difference DLTAMP is the second threshold value ΔA2 or larger in the aforementioned step S8, that is, when the amplitude difference DLTAMP is extremely large, it is estimated that burning of the cylinder occurs, and therefore the control of the active vibration isolation support system M in the operation period of this time is carried out based on the amplitudes AFR and ARR at the time when the same cylinder operates the last time in the step S10, that is, the amplitudes AFR and ARR in the same operation period in the second to the last rotation of the crankshaft. For example, the control of the active violation isolation support system M of the front bank Bf in the operation period P1 is performed based on the amplitude AFR in the same operation period P1 in the second to the last rotation of the crankshaft.

As a result, even if it is substantially impossible to determine whether the amplitude difference DLTAMP between the front bank Bf and the rear bank Br is large or small due to burning of the cylinder or the like, the control of the active violation isolation support system M can be continued without problem.

The embodiment of the present invention has been described in detail above, but the present invention can be modified in design in a variety of ways without departing from the subject matter of the invention.

For example, the active vibration isolation support system M is not limited to the one charged with a liquid, but may be the one using a piezo element.

In the embodiment, the active vibration isolation support system M for supporting the engine E of an automobile is shown as an example, but the active vibration isolation support system M of the present invention is applicable to support for any engine not for an automobile.

In the embodiment, an example of the V-type six-cylinder engine E is illustrated, but the present invention is applicable to a multi-cylinder engine of any type such as a V-type, a horizontally-opposed type and an X-type, as long as the engine has a plurality of banks.

What is claimed is:

1. An actuator drive control device for an active vibration isolation support system for controlling an operation of an actuator by a control apparatus so as to suppress transmission of vibration of an engine having a plurality of cylinder banks and multiple said actuators provided for said banks, respectively, wherein the control apparatus estimates a vibration state of the engine at a time when each of the banks operates, and controls the operation of each respective one of the actuators at the time when a predetermined bank corresponding to said respective one of said actuators operates, based on the estimated vibration state of the engine at the previous time when the predetermined bank operated.

2. The actuator drive control device for the active vibration isolation support system according to claim 1 wherein the control apparatus calculates a difference in the vibration state between the respective banks, and when the difference is less than or equal to a threshold value the control apparatus controls the operation of said respective one of the actuators of this time based on the vibration state of the bank which operated most recently.

3. The actuator drive control device for the active vibration isolation support system according to claim 1, wherein the control apparatus calculates a difference in the vibration state between the respective banks, and when the difference is greater than or equal to a threshold value, the control apparatus controls the operation of said respective one of the actuators of this time based on the vibration state at the time when the same cylinder as a cylinder which operates this time operated last time.

4. A method of operating an actuator of a drive control apparatus for an active vibration isolation support system so as to suppress transmission of vibration of an engine having a plurality of cylinder banks and multiple said actuators provided for said banks, respectively, said method comprising the steps of:

estimating a vibration state of the engine at a time when each of the banks operates; and controlling the operation of each respective one of the actuators at the next time when a predetermined bank corresponding to said respective one of the actuator operates, based on the estimated vibration state of the engine at the previous time when the predetermined bank operated.

5. The method according to claim 4, wherein the control apparatus calculates a difference in the vibration state between the respective banks, and when the difference is less than or equal to a threshold value, the control apparatus controls the operation of said respective one of the actuators of this time based on the vibration state of the bank which operated most recently.

6. The method according to claim 4, wherein the control apparatus calculates a difference in the vibration state between the respective banks, and when the difference is greater than or equal to a threshold value, the control apparatus controls the operation of said respective one of the actuators of this time based on the vibration state at the time when the same cylinder as a cylinder which operates this time operated last time.

7. The actuator drive control device for the active vibration isolation support system according to claim 2, wherein when the calculated difference in the vibration state between the respective banks is greater than or equal to another threshold value, the control apparatus controls the operation of the respective one of the actuators of this time based on the vibration state at the time when the same cylinder as a cylinder which operates this time operated last time.

8. The method according to claim 5, wherein the chive control apparatus calculates a difference in the vibration state between the respective banks, and when the difference is greater than or equal to another threshold value, the control apparatus controls the operation of the respective one of the actuators of this time based on the vibration state at the time when the same cylinder as a cylinder which operates this time operated last time.

9. An control device for an active vibration isolation support system of an engine having a pair of cylinder banks disposed on opposite sides of a crankshaft, said control device comprising:

a control apparatus to suppress transmission of vibration of flue engine; and a pair of actuators, provided respectively on said opposite sides of the crankshaft and associated with said cylinder banks, respectively;

wherein the control apparatus estimates a vibration state of the engine at a time when each of the banks operates, and controls the operation of respective ones of the actuators at the time when a predetermined bank corresponding to said respective one of The actuators operates, based on The estimated vibration state of the engine at The previous time when the predetermined bank operated.

10. The control device for the active vibration isolation support system according to claim 9, wherein The control apparatus calculates a difference in the vibration state between the respective banks, and when The difference is less than or equal to a threshold value, The control apparatus controls The operation of said respective one of the actuators being operated at this time based on the vibration state of the bank which operated most recently.

11. The control device for the active vibration isolation support system according to claim 9, wherein the control apparatus calculates a difference in the vibration state between the respective banks, and when the difference is greater than or equal to a threshold value, the control apparatus controls the operation of said respective one of the actuators being operated at this time based on the vibration state at the time when The same cylinder as a cylinder which operates this time operated last time.

12. The cotrol device for the active vibration isolation support system according to claim 10, wherein when the calculated difference in the vibration state between the respective banks is greater than or equal to another threshold value, the control apparatus controls the operation of the respective one of the actuators being operated at this time based on the vibration state at the time when the same cylinder as a cylinder which operates this time operated last time.

* * * * *